United States Patent
Paine et al.

[15] 3,681,581
[45] Aug. 1, 1972

[54] DIGITAL CONTROL AND INFORMATION SYSTEM

[72] Inventors: Thomas O. Paine, Administrator of the National Aeronautics and Space Administration with respect to an invention of; Larry William Moede, Los Angeles, Calif.

[22] Filed: Dec. 31, 1969

[21] Appl. No.: 889,584

[52] U.S. Cl..........235/151.1, 235/92 MT, 235/150.1, 340/347 AD, 323/19
[51] Int. Cl....................G05d 23/00, G05b 11/42
[58] Field of Search......323/22 SC; 235/151.1, 151.3; 318/601

[56] References Cited

UNITED STATES PATENTS

| | | | |
|---|---|---|---|
| 3,350,707 | 10/1967 | Perry | 340/347 |
| 3,351,746 | 11/1967 | Gotz et al. | 235/151.11 |
| 3,519,917 | 7/1970 | Martin | 323/22 SC |
| 3,237,313 | 3/1966 | Gevas | 318/602 X |
| 3,416,052 | 12/1968 | Russell et al. | 318/601 X |
| 3,495,074 | 2/1970 | Jacques | 235/151.1 |

*Primary Examiner*—Eugene G. Botz
*Attorney*—G. T. McCoy, J. H. Warden and Paul F. McCaul

[57] ABSTRACT

A digital control and information system is disclosed. A digital-to-analog converter digitizes an analog error signal provided by a system error detector. The digital error representation increments or decrements a data register once each system frame period. The output of the data register controls the duty cycle within each frame period of an actuator power gate. The data register at any given time, therefore, contains a digital number which both controls and represents the controlled parameter in a form suitable for transmission by telemetry apparatus. The control system may be commonly operated with a plurality of error detectors to provide a plurality of separate control loops. This is accomplished by time multiplexing the various error signals prior to the digitizing step and sampling the digitized output at times corresponding to the signal portion of interest. The sampled values update a plurality of data registers, one each associated with each control loop.

7 Claims, 3 Drawing Figures

INVENTOR.
LARRY WILLIAM MOEDE

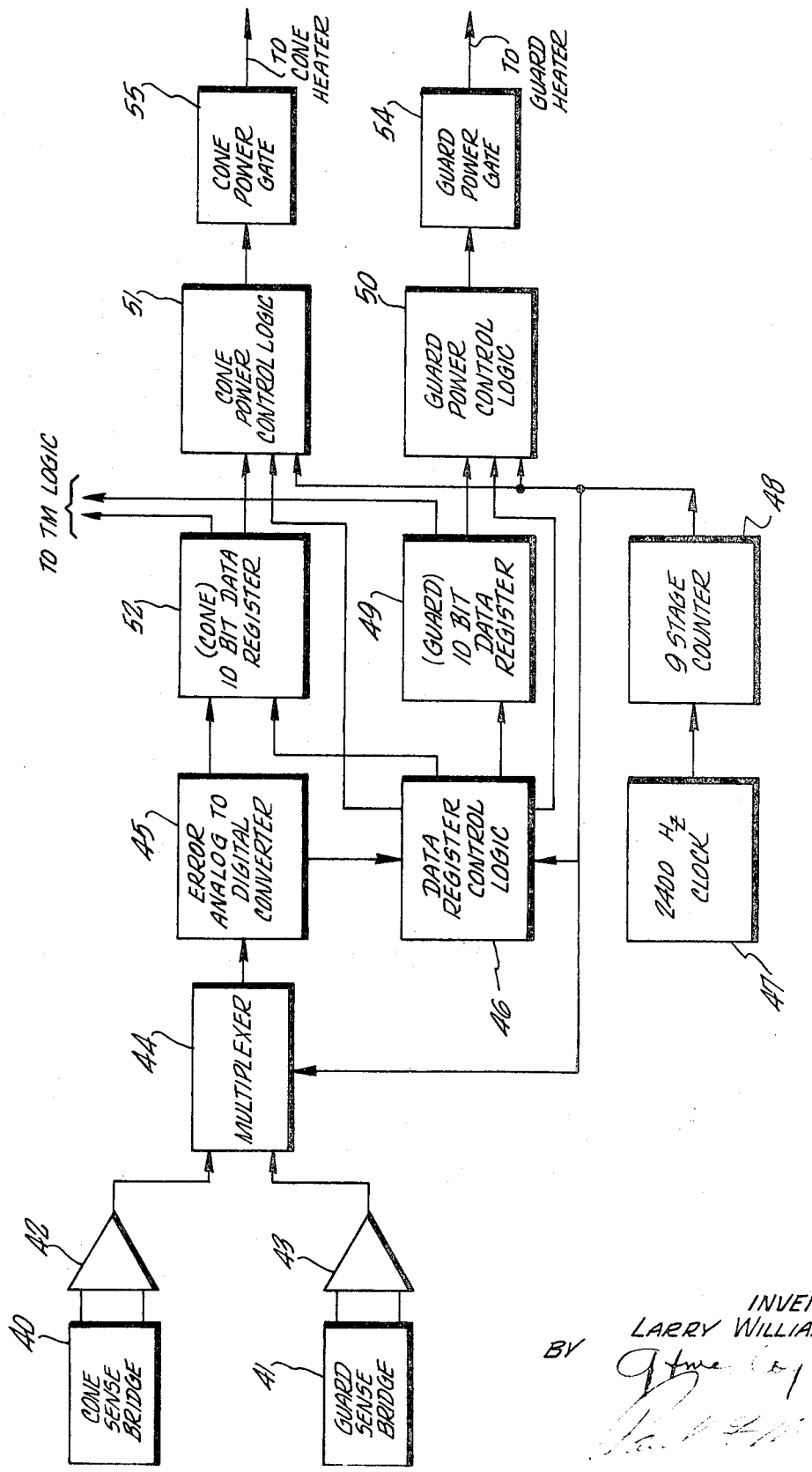

3,681,581

DIGITAL CONTROL AND INFORMATION SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to electronic control and information systems and more particularly to a digital control system for accurately controlling a parameter and providing digital telemetry data indicative thereof.

2. Description of the Prior Art

Systems for controlling parameters such as temperature, motion, frequency and the like, and providing digital telemetry data relating to such parameters, are known. Such systems typically include an analog control loop which controls the operation of an actuating means by the selective application of a current, voltage, or the like, for directing the controlled parameter to and maintaining it at an optimal value.

When digital telemetry data is required, a analog to-digital converter is typically provided which digitizes the sensed parameter values to generate digital data in suitable form for telemetry transmission.

Such systems suffer from a variety of defects. First, since analog components exhibit constantly varying performance as such components wear out, analog systems are generally unsuited for high accuracy control. Further, each analog component is generally limited to incorporation in only a single control loop. If more than one function control is required, separate control loops utilizing separate components for each loop must be provided.

These and other limitations result in multi-function analog control systems of extreme complexity and large size, features which are undesirable where weight and reliability criteria are important.

In addition, there often is a requirement to obtain digital telemetry data. Such data relates to the controlled parameter values. Sophisticated high resolution analog-to-digital converters must be provided in order to provide the required accuracy.

OBJECTS AND SUMMARY OF THE INVENTION

In accordance with the present invention, a digital information and control system is provided which overcomes the above noted difficulties. The control system may be used with any error detector which is adapted to provide error signals corresponding to the magnitude and sense of the deviation from optimum value of a changeable parameter such as temperature, motion, frequency and the like.

An analog-to-digital converter of relatively low resolution converts the error signal to a digital format. The digital error representation integrally and proportionally increments or decrements a data register. The data register value variation is effected once each system frame period. The output of the data register is applied to a duty cycle control logic circuit. The duty cycle control logic circuit controls the duty cycle of power applied to a system actuating means as a function of the data register value.

The power supply duty cycle is varied in discrete steps each frame period by counting down a high frequency clock signal with a divider chain. The outputs of the divider chain are applied to the duty cycle control logic circuit which compares the divider chain outputs with the data register values to control the duty cycle of an actuator power gate.

The data register at anY given time therefore contains a digital number which both controls and represents the controlled parameter in a form suitable for transmission by telemetry apparatus.

The control system thus described may be commonly operated with a plurality of error detectors to provide a plurality of separate control loops. This is accomplished by time multiplexing the various error signals. The multiplexed error signals are digitized by the amplitude-to-digital converter. The converter provides discrete digital output values at different sample times to update a plurality of data registers, one each associated with each control loop. Common duty cycle control logic, responsive to the values in the various registers, controls the duty cycles of a plurality of actuator power gates one each associated with each control loop.

It is therefore an object of this invention to prOvide an accurate digitized control system which incorporates an analog-to-digital conversion in the control loop itself.

It is another object of the present invention to provide a digitized control system capable of providing digital telemetry data which accurately represents the controlled parameter.

It is a further object of the present invention to provide a digitized control system wherein common control elements are used in a plurality of separate control loops.

Still other objects, features and attendant advantAges of the present invention will become apparent to those skilled in the art from a reading of the following description of several embodiments constructed in accordance therewith taken in conjunction with the accompanying drawings and wherein:

BRIEF DESCRIPTION OF THE DRAWINGS

FIG. 2 is a block diagram of a second embodiment of a digital control and telemetry data acquisition system wherein commonly shared control elements are incorporated to provide a plurality of separate control loops.

DESCRIPTION OF THE PREFERRED EMBODIMENT

Figure 1:
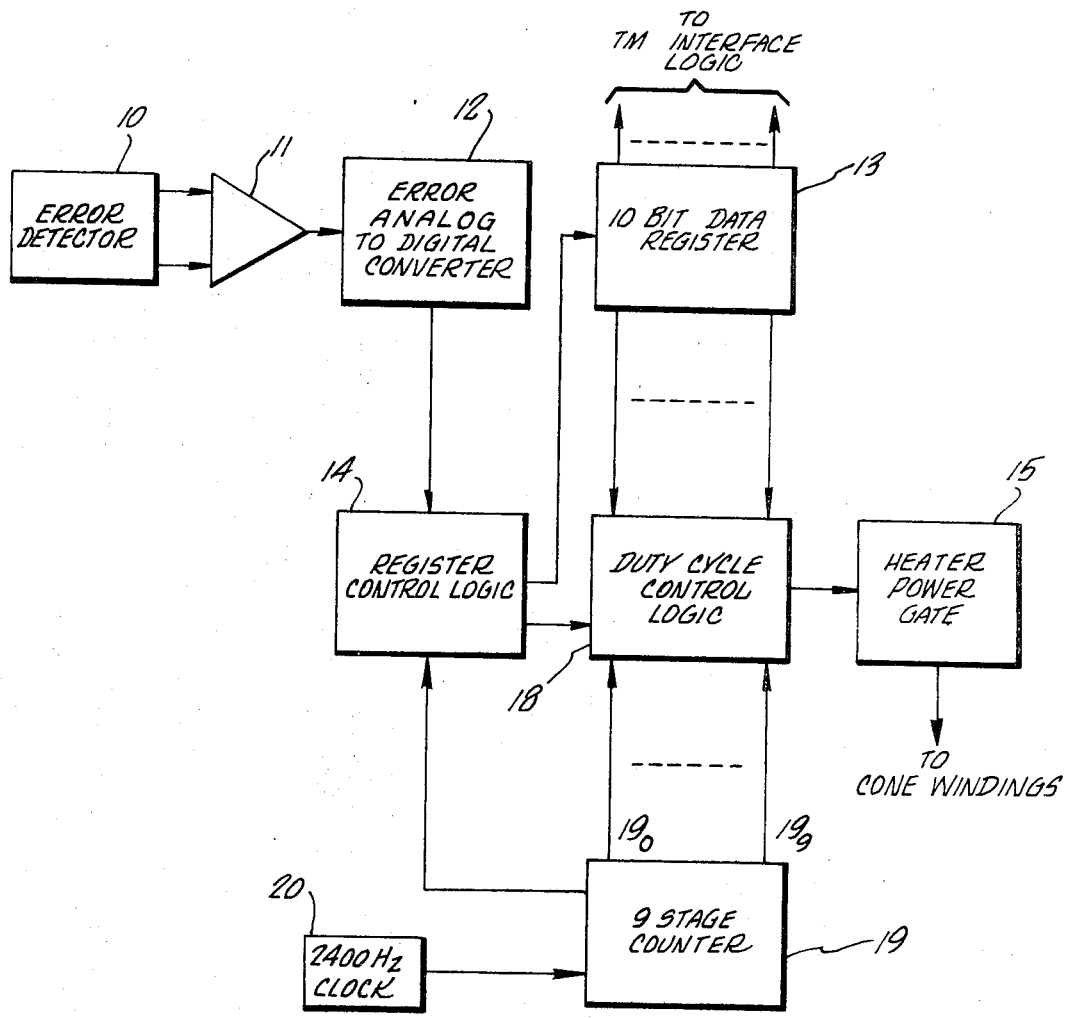
FIG. 1 is a block diagram of one embodiment of a digital control and telemetry data acquisition system constructed in accordance with the principles of the present invention.

Referring now to FIG. 1, there is shown an exemplary digital electronic control and telemetry data acquisition system constructed in accordance with the principles of the present invention.

Figure 3:
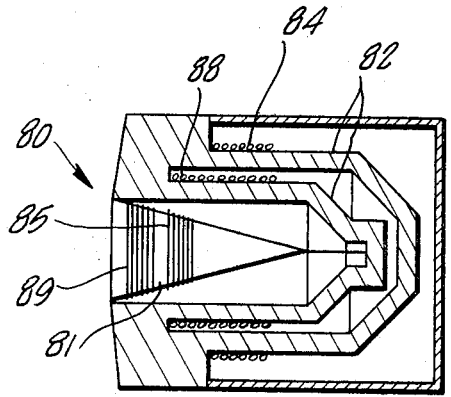
FIG. 3 depicts an exemplary controlled radiometer which is useful in understanding the systems of FIGS. 1 and 2.

The exemplary system of FIG. 1 is adapted to control and acquire telemetry data relating to a radiation transducer or radiometer. An exemplary radiometer 80 is illustrated in FIG. 3. The radiometer of FIG. 3 includes a radiation cone structure 81 and a thermal guard structure designated at 82. The guard is maintained at a predetermined set point temperature by applying power to guard heater windings 84 associated with the guard. Thermal energy is similarly applied to the cone via cone heater windings 85. The guard and cone temperatures are sensed by guard temperature sensor windings 88 and cone temperature sensor windings 89, respectively.

Since the guard is maintained at a predetermined set point temperature, the energy required by the cone heater windings to maintain the cone temperature at the guard set point temperature is a measure of the net radiation incident upon the conical cavity. The cone heater energy may be determined by measuring the electrical power required to be delivered to the cone heater windings to maintain the cone at the guard set point temperature.

The block diagram of FIG. 1 illustrates the control and telemetry data acquisition system which, in accordance with the principles of the present invention, is adapted to both maintain the cone temperature at the guard set point temperature and, in addition, to provide digital telemetry data correlatable with the energy required to so maintain the radiometer cone temperature.

Referring now in detail to the block diagram of FIG. 1, an error detector 10 provides an output signal proportional to the difference between the guard and the cone temperature. Error detector 10 may, for example, be a standard sensing bridge having the guard and cone sensor windings connected in opposite legs of the bridge. Since the resistance values of the sensor windings are a function of temperature, the cone sensing bridge generates an error voltage proportional to the difference between the cone and the guard temperatures. The error signal thus generated is amplified by error amplifier 11, the output of which is applied to an error analog-to-digital converter 12.

Converter 12 converts the error signal to a digital number indicative of both the amplitude and "sense" of the analog error signal provided by amplifier 11.

At a data register update time controlled by register control logic 14, the output from analog-to-digital converter 12 is used to update a 10 bit data register 13. In a manner to be hereinafter described, the duty cycle of the cone heater-power waveform is controlled by the state of the 10 bit data register 13.

The register is within the cone power control loop and functions to both control and represent the cone heater power.

The number in the 10 bit data register controls the duty cycle of the applied heater power in the following manner. A 2,400 Hz clock signal derived from clock source 20 is applied to a nine stage binary counter 19. The nine stage counter in a well-known manner counts down the 2,400 Hz clock. The output leads of the nine stage counter are applied to duty cycle control logic 18. The duty cycle control logic also receives as an input, the value in the 10 bit data register 13.

At the start of each frame period, the register control logic 14 provides an enabling pulse through duty cycle control logic 18 to heater-power gate 15. When enabled, heater-power gate 15 supplies a voltage of predetermined amplitude to the cone heater windings 85, FIG. 3. The heater voltage is supplied continuously until heater-power gate 15 is disabled by the duty cycle control logic 18.

The duty cycle control logic 18 continuously compares the 10 bit data register ten outputs to the output of the nine stage binary counter. The duty cycle control logic circuit 18 may be any comparator circuit that is adapted to provide an output pulse, or signal, when the signals applied thereto for comparison are favorably compared. When the value of the signal provided from the nine stage counter corresponds to that in the 10 bit data register, the duty cycle control logic disables heater-power gate 15 for the remainder of the frame time. Since nine stage counter 19 is being stepped by a 2,400 Hz clock, the duty cycle of the power waveform may be varied incrementally in steps of 208.3 microseconds (one-half period of the 2,400 Hz clock) from 0–1023 incremental units in a frame period of 0.213 seconds.

At the start of the next succeeding frame time, the register control logic causes the error analog-to-digital converter 12 to read the next digital error value into the 10 bit data register 13. As shown by FIG. 1, the control logic circuit 14 is coupled to the counter 19 and is thus properly timed to effect the updating of the register 13 and the enabling of the power gate 15 once each frame. This may be accomplished in any manner well known in the art, for example, by being coupled to the output of the last stage of the counter 19. The heater-power gate 15 is again enabled and remains in an "on" condition for a time determined by the updated value within the 10 bit data register.

The cone heater voltage is therefore applied to the cone heater winding as a series of rectangular pulses which occur regularly in time and commence at the start of each system frame time. Each pulse width is variable and is determined by the state of the 10 bit data register. In the specific embodiment of FIG. 1, the register states can represent any pulse width value from 0 to 1023 units.

Each count in the register therefore contributes 1/1024 of the power that would be dissipated if the heater voltage were applied as a steady value. The cone heater power is therefore given by the equation:

$$P_c = (N/1024)(E_c^2/R_c) \tag{1}$$

where $E_c$ is the peak value of the voltage, $R_c$ is the cone heater winding resistance value, and $N$ is the number in the data register 13. The number in the register therefore both determines and represents the cone heater power.

The register values are already in a digital form suitable for application to telemetry apparatus for transmission to a remote data processing location, not shown.

It is worthwhile to note that if at each update time some number of counts corresponding to the output of the error analog-to-digital converter 12 were simply added to or subtracted from the data register, there would result a control system with pure integral control. If the number of counts added or substacted were proportional to the error value, the result would still be a system with pure integral control, but with variable integral gain. Such pure integral control systems are generally unstable since they are substantially underdamped.

To provide for stable operation, it is generally necessary to provide proportional as well as integral control. If, at each update time, the data register were to be set to zero and then set to a new value proportional to the error level, the result would be a system with proportional control only. Although such a system would be stable, it would have poor accuracy as the error would generally never be zero.

The desired system is one with both integral and proportional control. This is accomplished by the register control logic 14 of FIG. 1. The register control logic resets the data register 13 at each update time, not to zero but instead to some non-zero value. This non-zero value then becomes the integrated error value. The amount by which the register is changed to yield the integrated value is equal to the proportional value.

The integral and proportional count variations for various error values (calibrated in degrees centigrade) suitable for incorporation in the present invention are given in the following table:

| Error (°C) | Integral Counts | Proportional Counts |
| --- | --- | --- |
| 0.1 | 1 | 32 |
| 0.2 | 2 | 64 |
| 0.4 | 4 | 128 |
| 3.2 | 32 | 256 |

A numerical example will be helpful in explaining the manner in which these values are used. Assume the data register contains 500 counts and the temperature error is greater than −0.1° C but less than −0.2° C. Expressed binarily, the outputs oF the register 13 would form the ten bit binary number 0111110100. One integral count and 32 proportional counts are added to the register for a total count of 533, i.e., the outputs of the register 13 would be changed to the ten bit binary number 100001010. At the next update time, the previous proportional value of 32 counts is subtracted from the data register. If the error is less than 0.1° C no additional counts will be added, and the register will now contain 501 counts. For different error levels the mechanism is the same except for the number of counts added to or subtracted from the register. Once the numbers, or changes of numbers, for the register 13 are selected as exemplified by the foregoing table, the register control circuit 14 may be fabricated with any digital enabling circuit, or digital to digital converter circuit, that is well known in the art.

Referring now to FIG. 2, an important aspect of the present invention is illustrated. Depicted in FIG. 2 is a plural control loop system wherein a number of control components are commonly shared to reduce the total number of components required. The control loops of FIG. 2 are adapted to control both the cone temperature and the guard temperature.

For the guard control loop there is provided a guard sense bridge 41. Sense bridge 41 generates an error voltage output signal proportional to the difference between the guard set point temperature and the actual guard temperature. The error signal thus generated is amplified by error amplifier 43. The output of amplifier 43 is applied to multiplexer 44. Multiplexer 44 also receives the output from error amplifier 42 which, as in FIG. 1, provides an error voltage output proportional to the difference between the cone temperature and the guard temperature.

Multiplexer 44 time multiplexes the cone error signal and the guard error signal in such a manner that the first half of each successive frame period contains the cone error signal while the second half of each successive frame period contains the guard error signal.

The time multiplexed error signals are applied to error analog-to-digital converter 45. Converter 45, as in the embodiment of FIG. 1, provides a digital output indicative of the sense and magnitude of the applied error signals. However, in the embodiment of FIG. 2, the output of converter 45 during the first half of each frame period corresponds to the digitized cone error signal. During the second half of each frame time, the output of converter 45 corresponds to the digital value of the guard error signal. Under the control of the data register control logic 46, the digitized cone error signal updates the cone data register 52 once each frame period. The digitized guard error signal in a like manner updates the guard data register 49 once each frame time but displaced in time one-half frame from the cone update time.

As in the embodiment of FIG. 1, the duty cycle of the cone power gate 55 and the guard power gate 54 are controlled by the value in the respective data registers 52 and 49. A nine stage counter 48 sequences through a plurality of output states under the influence of a 2,400 Hz clock 47. The counter outputs are provided to a cone power control logic circuit 51 and a guard power control logic circuit 50 respectively. Cone control logic 51 receives as a second input the value of the 10 bit cone data register 52 while guard control logic 50 receives as a second input the value of the 10 bit guard data register 49.

Since the updating of the guard data register with respect to the cone data register is displaced by one-half frame time, the digital word stored by the guard register 49 and compared in the guard control logic is set to compensate for the time displacement by defining a "zero" guard data register reading as coinciding with a one-half frame count in the nine stage counter 48. As an example, where the counter 19 counts from 0 to 1023 in a frame time, the counts 0 to 511 may be for cone control and the counts 512 to 1023 may be for guard control. As in the embodiment of FIG. 1, the cone control logic and power control logic circuits 51 and 50 respectively control the duty cycles of cone power gate 55 and guard power gate 54. Although the embodiment of FIG. 2 is directed to a dual control loop system, such is not a limitation. Additional control loops may be readily incorporated by simply time multiplexing additional error signals and adjusting the update times of the associated data registers accordingly.

It is to be noted that after each data register is updated the control circuit is open-looped, allowing guard and cone heater power of the respectively required duty cycles to be applied totally under the control of the digital logic. Since the time required to update each data register is small compared to the time period between data updating the data processing logic may commonly be utilized to control a large number of individual loops.

As in the embodiment of FIG. 1, the data register values are available for application to telemetry apparatus for transmission to a remote data processing location.

What is claimed is:

1. A digital control system for controlling a plurality of changeable parameters by regulating the operation of a plurality of parameter control actuators, one each associated with each parameter, said system comprising:

error detecting means for generating a plurality of error signals one each associated with each parameter, each error signal representing the deviation of its associated parameter from a preselected value;

means for time multiplexing said error signals for producing a multiplexed error signal characterized in that for each of a plurality of successive system defined frame periods each of said error signals appears alone during a distinct predetermined portion of each frame period;

digitizing means for generating a digital signal representative of said multiplexed error signal;

a plurality of digital storage registers one each associated with each of said plurality of error signals, each adapted to store a digital value;

means for sampling said digitized multiplexed error signal during each of said predetermined portions of each frame period to obtain a plurality of sample values, one each corresponding to each of said error signals;

means for varying the stored digital value in each of said storage registers as a function of each associated sample value, said stored digital value being updated to include a value representative of associated detected errors; and means for operating each of said plurality of parameter control actuators for a time functionally related to the varied stored value in each actuator's associated register.

2. A control system for controlling the application of power to a workpiece in accordance with the difference between the actual temperature and a preselected temperature of the workpiece, said system comprising:

sensing means for providing an error signal representative of said difference between the actual temperature and preselected temperature of said workpiece;

digital means for providing a digital error signal that is representative of said error signal provided by said sensing means;

power period means responsive to said digital error signals for providing digital power signals defining a power time period during which power is to be applied to said workpiece;

timing means for providing a succession of digital timing signals defining a frame time period, and comparator means for comparing said digital power signals to said succession of digital timing signals, said power time period having a duration commencing at the start of said frame time period and ending upon a favorable comparison of said digital power signals and said digital timing signals, said comparator enabling the application of power to said workpiece for the duration of said power time period.

3. The apparatus defined by claim 2 wherein said timing means includes:

a source of clock signals; and a binary counter for providing said succession of digital timing signals in response to said clock signals.

4. The apparatus defined by claim 2 wherein said digital means includes:

an analog to digital converter circuit for receiving said error signal and providing a digital error signal equivalent thereto; and said power period means includes:

a data register for storing said digital power signals, and means for changing said digital power signals in accordance with said digital error signals, said digital power signals thereby being a function of said error signals.

5. The apparatus defined by claim 4 wherein said timing means includes:

a source of clock signals; and a binary counter for providing said succession of digital timing signals in response to said clock signals.

6. A digital control system for controlling the periodic application of power to a heating element of a workpiece in accordance with the deviation of the workpiece temperature from a preselected temperature, the digital control system comprising:

error means for generating an error signal representative of the deviation of the workpiece temperature from a preselected temperature;

digitizing means for converting said error signal to a digital error signal;

means for storing a digital control signal defining a power time period during which power is to be applied to a heating element of said workpiece, said power time period representing a portion of a frame time period;

means for varying said stored digital control signal as a function of said digital error signal; and control means responsive to said digital control signal for enabling the application of power to said heating element of said workpiece for the duration of said power time periods, said control means including frame means for defining successive frame time periods, said power time period and said frame time period commencing concurrently.

7. The digital control system defined by claim 6, said means for storing a digital control signal including a register for storing multibit digital words representing said digital control signals;

said frame means including a source of clock signals and a digital counter responsive to said clock signals for providing a succession of digital numerical words which are cyclically advanced from a minimum numerical count to a maximum numerical count, a frame time period being defined by each cycle; and said control means further including a comparator for comparing said digital control signals to said digital numerical words, the application of power to said workpiece during each frame time period being stopped in response to a favorable comparison of said digital control signal and said digital numerical words.

* * * * *